(12) United States Patent
Katou et al.

(10) Patent No.: US 8,097,317 B2
(45) Date of Patent: Jan. 17, 2012

(54) HIGH-GLOSS MULTILAYER PLASTIC CONTAINER

(75) Inventors: Yuuichirou Katou, Yokohama (JP); Masayoshi Tanaka, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 361 days.

(21) Appl. No.: 12/524,250

(22) PCT Filed: Oct. 26, 2007

(86) PCT No.: PCT/JP2007/070900
§ 371 (c)(1),
(2), (4) Date: Jul. 23, 2009

(87) PCT Pub. No.: WO2008/090655
PCT Pub. Date: Jul. 31, 2008

(65) Prior Publication Data
US 2010/0086715 A1    Apr. 8, 2010

(30) Foreign Application Priority Data

Jan. 26, 2007 (JP) .................................. 2007-015766

(51) Int. Cl.
*B29D 22/00* (2006.01)
*B29D 23/00* (2006.01)
*B32B 1/08* (2006.01)

(52) U.S. Cl. .................. 428/35.7; 428/36.9; 428/36.91; 428/220; 428/480; 428/500

(58) Field of Classification Search ................ 428/35.7, 428/36.9, 36.91, 220, 480, 500
See application file for complete search history.

(56) References Cited

FOREIGN PATENT DOCUMENTS

| JP | 01-295848 A | 11/1989 |
|----|-------------|---------|
| JP | 03-032453 B2 | 5/1991 |
| JP | 0332453 B2 | 5/1991 |
| JP | 06079842 A | 3/1994 |
| JP | 06106606 A | 4/1994 |

*Primary Examiner* — Michael C Miggins
(74) *Attorney, Agent, or Firm* — Sughrue Mion, PLLC

(57) ABSTRACT

Provided is a high-gloss, multilayer plastic container, comprising: (1) a transparent polyester-based resin outer layer; (2) a transparent adhesive resin layer; and (3) a colored polyolefin-based resin layer in the stated order from an outer surface side of the container, wherein: the transparent polyester-based resin outer layer has a surface roughness Ra of 0.2 μm or less; and an interface between (2) the transparent adhesive resin layer and (3) the colored polyolefin-based resin layer has a concavoconvex level of 15 μm or less. An interface between (1) the transparent polyester-based resin outer layer and (2) the transparent adhesive resin layer preferably has a concavoconvex level of 15 μm or less. According to the present invention, a multilayer plastic container having an even, smooth surface, a high-gloss, deep color tone, and an extremely excellent external appearance can be obtained.

9 Claims, 1 Drawing Sheet

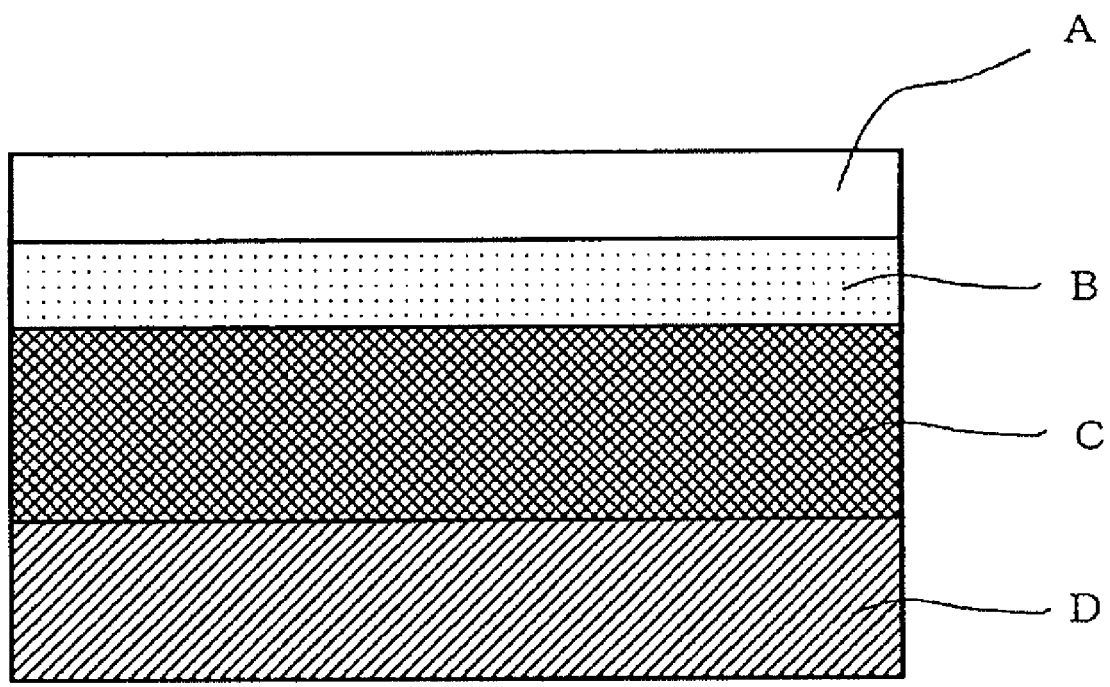

HIGH-GLOSS MULTILAYER PLASTIC CONTAINER

TECHNICAL FIELD

The present invention relates to a multilayer plastic container having an excellent external appearance and deep, high surface gloss.

BACKGROUND ART

Polyester-based resins typified by polyethylene terephthalate (PET) have been widely used in containers such as bottles for storing various beverages, detergents, cosmetics, and the like because each of the resins is excellent in, for example, heat resistance, transparency, and mechanical strength, and its surface is hardly flawed. Meanwhile, polyolefin-based resins such as polyethylene and polypropylene have been widely used as materials of which various containers are constituted because of their excellent moldability, low prices, and the like.

In addition, various plastic containers having additionally excellent characteristics provided by the following procedure have also been proposed: those resins are arbitrarily combined so that each of the containers may have a multilayer structure. For example, a multilayer plastic container having the following layer constitution has been conventionally known (see, for example, Patent Documents 1 and 2) : (1) a polyester-based resin outer layer, (2) an adhesive resin layer, and (3) a polyolefin-based resin layer are laminated in the stated order from the outer surface side of the container.
Patent Document 1: JP 06-79842 A
Patent Document 2: JP 06-106606 A However, a multilayer plastic container having such a layer constitution involves differences in molding characteristics such as a melt resin viscosity among a polyester-based resin, an adhesive resin, and a polyolefin-based resin of which the container is constituted. Therefore, upon production of, for example, a hollow container by blow molding after the formation of a multilayer parison, an external appearance failure such as a grain pattern or a ripple pattern may occur in the polyester-based resin outer layer at the surface of the container or in an interface between adjacent layers of the container. In addition, the hue of the container becomes uneven, so a hue failure such as the production of a stripe-like pattern occurs. Accordingly, it has been unable to realize a multilayer plastic container having an excellent external appearance such as a container having a high-gloss, deep, evenly metallic color tone.

In addition, a reduction in roughness of a surface in a die intended for smooth finish of the surface of the container involves the emergence of an air trap at the time of the molding of the container (phenomenon in which an untransferred portion of a die shape remains owing to the incorporation of air between the die and the surface of the molded article). As a result, the following problem arises: a molding failure such as a partial concavoconvex occurs at the surface of the container.

DISCLOSURE OF THE INVENTION

Problems to be Solved by the Invention

Therefore, an object of the present invention is to provide a multilayer plastic container having an even, smooth surface, a high-gloss, deep color tone, and an extremely excellent external appearance by solving problems peculiar to the above-mentioned multilayer plastic container obtained by combining a polyester-based resin layer and a polyolefin-based resin layer.

Means for Solving the Problems

The inventors of the present invention have discovered that the above problems can be solved by setting the concavoconvex level of an interface between the adhesive resin layer and a colored polyolefin-based resin layer adjacent to the inner side of the adhesive resin layer to 15 μm or less while reducing the surface roughness of the polyester-based resin outer layer. Thus, the inventors have completed the present invention.

That is, the following constitutions of 1 to 9 are adopted in the present invention.

1. A high-gloss, multilayer plastic container, comprising: (1) a transparent polyester-based resin outer layer; (2) a transparent adhesive resin layer; and (3) a colored polyolefin-based resin layer in the stated order from an outer surface side of the container, wherein: the transparent polyester-based resin outer layer has a surface roughness Ra of 0.2 μm or less; and an interface between (2) the transparent adhesive resin layer and (3) the colored polyolefin-based resin layer has a concavoconvex level of 15 μm or less.

2. A high-gloss, multilayer plastic container according to the item 1, wherein an interface between (1) the transparent polyester-based resin outer layer and (2) the transparent adhesive resin layer has a concavoconvex level of 15 μm or less.

3. A high-gloss, multilayer plastic container according to the item 1 or 2, wherein (3) the colored polyolefin-based resin layer contains a luster pigment.

4. A high-gloss, multilayer plastic container according to anyone of the items 1 to 3, wherein (3) the colored polyolefin-based resin layer is constituted of a block polypropylene-based resin.

5. A high-gloss, multilayer plastic container according to anyone of the items 1 to 3, wherein (3) the colored polyolefin-based resin layer is constituted of a high-density polyethylene-based resin.

6. A high-gloss, multilayer plastic container according to any one of the items 1 to 5, wherein (2) the transparent adhesive resin layer is constituted of a polyethylene-based resin.

7. A high-gloss, multilayer plastic container according to any one of the items 1 to 6, wherein a layer constitution of the multilayer plastic container has (1) the transparent polyester-based resin outer layer, (2) the transparent adhesive resin layer, (3) the colored polyolefin-based resin layer containing a luster pigment, and (4) a colored polyolefin-based resin layer free of any luster pigment in the stated order from the outer surface side.

8. A high-gloss, multilayer plastic container according to any one of the items 1 to 7, further comprising a polyolefin-based resin inner layer.

9. A high-gloss, multilayer plastic container according to any one of the items 1 to 8, wherein a total thickness of (1) the transparent polyester-based resin outer layer and (2) the transparent adhesive resin layer is 30 to 200 μm.

Effect of the Invention

According to the present invention, a multilayer plastic container having a smooth surface free of an external appearance failure such as a grain pattern, a ripple pattern, or foaming and a high-gloss, deep, evenly metallic color tone can be efficiently obtained without the occurrence of any molding failure.

BRIEF DESCRIPTION OF THE DRAWING

FIG. 1 is a schematic sectional view illustrating an example of the layer constitution of a high-gloss, multilayer plastic container of the present invention.

DESCRIPTION OF SYMBOLS

A transparent polyester-based resin outer layer
B transparent adhesive resin layer
C colored polyolefin-based resin layer containing luster pigment
D colored polyolefin-based resin layer free of luster pigment

BEST MODE FOR CARRYING OUT THE INVENTION

The layer constitution of a multilayer plastic container in the present invention is as follows: the multilayer plastic container has (1) a transparent polyester-based resin outer layer, (2) a transparent adhesive resin layer, and (3) a colored polyolefin-based resin layer in the stated order from its outer surface side. In addition, the multilayer plastic container has the following characteristics: while a surface roughness Ra of the polyester-based resin outer layer is set to 0.2 μm or less, a method such as the blending of a lubricant into the transparent adhesive resin layer is adopted so that the concavoconvex level of an interface between (2) the transparent adhesive resin layer and (3) the colored polyolefin-based resin layer may be set to 15 μm or less, and the concavoconvex level of an interface between (1) the transparent polyester-based resin outer layer and (2) the transparent adhesive resin layer may be set to 15 μm or less.

(Surface Roughness Ra of Container)

The surface roughness Ra of the transparent polyester-based resin outer layer in the present invention means the maximum value of a surface roughness (Ra) as an arithmetic average obtained as described below: the surface roughness of a flat portion of the wall of the container except a nozzle portion is measured with a stylus roughness measuring device in conformity with JIS B0601 at a measurement interval of 4 mm, and the measured values are averaged.

(Concavoconvex Level of Interface Between Resin Layers)

In addition, a portion having a large interfacial concavoconvex level is sampled from the flat portion of the wall of the container except the nozzle portion for the measurement of: the concavoconvex level of the interface between (2) the transparent adhesive resin layer and (3) the colored polyolefin-based resin layer; and the concavoconvex level of the interface between (1) the transparent polyester-based resin outer layer and (2) the transparent adhesive resin layer. Next, the container section of the resultant sample is cut with a rotary microtome, and the resultant surface is defined as an observation surface. Further, the remaining sample is cut at a vertical thickness of 30 μm from the observation surface so that a cut surface to be obtained may be parallel to the observation surface. The observation surface of a sample thus obtained is observed with an optical microscope, and concavoconvex levels are measured. Each of the above concavoconvex levels means the maximum value out of the measured values.

(Total Thickness of Outer Layer and Transparent Adhesive Resin Layer)

The total thickness of (1) the transparent polyester-based resin outer layer and (2) the transparent adhesive resin layer means a value measured as described below. As in the case of the foregoing, a sample with its section in the vertical direction relative to the side wall of the container defined as an observation surface is produced. Then, the observation surface is observed with an optical microscope, and the total thickness of the outer layer and the transparent adhesive resin layer is measured.

As the transparent polyester-based resin which constitutes the outermost layer of the multilayer plastic container, thermoplastic polyesters such as polyethylene terephthalate, polybutylene terephthalate, and polynaphthalene terephthalate may be used.

As a preferred polyester, polyethylene terephthalate (PET) is exemplified. However, a copolyester containing an ethylene terephthalate unit as a main component and another polyester unit can be used as long as the essential of polyethylene terephthalate is not impaired.

AS a copolymer component for forming such a copolyester, there are exemplified: dicarboxylic acid components such as isophthalic acid, p-β-oxoethoxy benzoic acid, naphthalene 2,6-dicarboxylic acid, diphenoxyethane-4,4'-dicarboxylic acid, 5-sodium sulfoisophthalic acid, adipic acid, sebacic acid, and alkylester derivatives thereof; glycol components such as propylene glycol, 1,4-butanediol, neopentyl glycol, 1,6-hexylene glycol, cyclohexane dimethanol, an ethylene oxide adduct of bisphenol A, diethylene glycol, and triethylene glycol.

A particularly preferable polyester-based resin is, for example, an amorphous PET. The polyester-based resin to be used is preferably a polyester having an intrinsic viscosity [72] of 0.5 (dl/g) or more, or particularly 0.6 (dl/g) or more from the viewpoint of the mechanical nature of the container wall.

In addition, the polyester-based resin may be colorless, or maybe colored as long as the resin is transparent. A conventionally known additive may be added to the polyester-based resin to such an extent that the transparency of the resin is not impaired. For example, a thermoplastic elastomer, any other thermoplastic resin, a rubber resin, an inorganic filler, a pigment, a plasticizer, an antioxidant, an antistatic agent, a light stabilizer, an anti-blocking agent, a lubricant, or a dye can be used as the additive. However, it is preferred that the use of such an additive that the surface roughness of the polyester-based resin is increased be avoided.

A blow die the inner surface of which has a surface roughness Ra of about 0.2 μm or more and 0.8 μm or less is used in order that the polyester-based resin outer layer may have a surface roughness Ra of 0.2 μm or less. The use of a die treated as described above can provide a container the outer layer of which has a surface roughness Ra of at most 0.2 μm. When the surface roughness Ra of the container exceeds 0.2 μm, light beams are irregularly reflected at the surface of the container, with the result that the external appearance of the container shows reduced gloss.

Reducing the surface roughness of the inner surface of the blow die causes an air trap at the time of the molding of the plastic container, so a molding failure such as a partial surface concavoconvex occurs in some cases. In addition, when the concavoconvex level of the interface between (1) the transparent polyester-based resin outer layer and (2) the transparent adhesive resin layer adjacent to the inner side of the outer layer, or the concavoconvex level of the interface between (2) the transparent adhesive resin layer and (3) the colored polyolefin-based resin layer adjacent to the inner side of the adhesive resin layer increases, the hue of the container becomes uneven, so a hue failure such as the production of a stripe-like pattern occurs in some cases.

In the present invention, such a molding failure is prevented as described below: while the water content of the polyester-based resin is adjusted to about 500 to 1,500 ppm, a method such as the blending of a lubricant into the transparent adhesive resin layer is adopted so that the maximum concavoconvex level of each of the above interfaces between resin layers may be set to 15 μm or less. When the water content of the transparent polyester-based resin becomes lower than 500 ppm, the surface roughening of the polyester-based resin layer called sharkskin occurs. On the other hand, when the water content exceeds 1,500 ppm, foaming occurs.

A polyester-based resin and a polyolefin-based resin adhere to each other to a small extent, and are different from each other in molding characteristics such as a melt viscosity. Therefore, the molding of a conventional multilayer plastic container has sometimes involved the emergence of an external appearance failure such as a grain pattern or a ripple pattern in the polyester-based resin outer layer at the surface of the container or in an interface between adjacent layers of the container.

The term "grain pattern" refers to a concavoconvex pattern occurring mainly at the interface between (1) the transparent polyester-based resin outer layer and (2) the transparent adhesive resin layer. When viewed from the side wall surface of the container, the concavoconvexes look like a grain (scale) owing to light reflection. When a section of the multilayer plastic container is observed, (1) the transparent polyester-based resin outer layer shows slight disturbance, but (2) the transparent adhesive resin layer is disturbed in such a manner that recesses are periodically formed toward (2) the transparent adhesive resin layer from the interface between both the layers. Such concavoconvexes can be observed well from a circumferential section of the side wall of the container, and many of them each have a width of 30 to 100 μm and a thickness of 15 to 50 μm. Although the reason why the concavoconvexes occur is unclear, the concavoconvexes may occur owing to an uneven resin flow at the confluence of molten resins upon production of a multilayer parison.

The term "ripple pattern" refers to a concavoconvex pattern occurring mainly at the interface between (2) the transparent adhesive resin layer and (3) the colored polyolefin-based resin layer. When viewed from the side wall surface of the container, the concavoconvexes look like continuous ripples in the circumferential direction of the container. When a section of the multilayer plastic container is observed, (3) the colored polyolefin-based resin layer protrudes like a wave toward (2) the transparent adhesive resin layer from the interface between both the layers. At some places, protruded portions of (3) the colored polyolefin-based resin layer may be separated from each other with a thin gap formed of (2) the transparent adhesive resin layer interposed between them. The concavoconvexes can be observed well from a section in the height direction of the side wall of the container, and many of them each have a width of several hundreds of micrometers and a thickness of 15 to 50 μm. Although the reason why the concavoconvexes occur is unclear, the concavoconvexes may occur owing to an uneven resin flow at the confluence of molten resins upon production of a multilayer parison.

In the present invention, the differences in molding characteristics between the polyester-based resin outer layer and the polyolefin-based resin layer are canceled by (A) blending a lubricant into the transparent adhesive resin layer or (B) adjusting the shearing stress of the resin of each layer of which the multilayer plastic container is constituted and the melt flow rate (MFR) of the resin of which the transparent adhesive resin layer is constituted at the time of the molding of the container. As a result, a multilayer plastic container having the following characteristics can be obtained: the concavoconvex level of the interface between (1) the transparent polyester-based resin outer layer and (2) the transparent adhesive resin layer adjacent to the inner side of the outer layer, and the concavoconvex level of the interface between (2) the transparent adhesive resin layer and (3) the colored polyolefin-based resin layer adjacent to the inner side of the adhesive resin layer are reduced so that the container may have an excellent external appearance, peeling between resin layers and the like are prevented, and the container is excellent in properties such as impact resistance.

(A) Blending of Lubricant into Transparent Adhesive Resin Layer

When a lubricant is blended into the transparent adhesive resin layer, the content of the lubricant is preferably about 0.01 to 0.5 wt %, or particularly preferably about 0.02 to 0.1 wt %. When the content of the lubricant is smaller than 0.01 wt %, the blending of the lubricant exerts no effect. On the other hand, when the content of the lubricant is larger than 0.5 wt %, the outer layer and the transparent adhesive resin layer may peel from each other.

Particles having an average particle diameter of about 0.5 to 40 μm are preferably used in the lubricant. In addition, the kind of the lubricant is not particularly limited, and a lubricant selected from, for example, hydrocarbon-, metal soap-, amide-, ester-, and fluorine-based lubricants can be used; in particular, a fluorine-based lubricant is preferably used.

A conventionally known resin capable of adhering to both a polyester resin and a polyolefin resin can be used as the transparent adhesive resin. For example, an ethylene/α-olefin copolymer resin or an acid-denatured resin of the copolymer resin, a copolymer resin of an olefin and an acid, or a glycidyl group-containing resin can be used. In addition, a conventionally known tackifier may be added to any one of those resins for improving the adhesiveness of the resin.

As the copolymer, a copolymer produced in any one of copolymerization methods such as a random, a block, or a graft copolymerization can be used. As the acid-denatured resin, there are used, for example, those obtained by graft modification with unsaturated carboxylic acids such as acrylic acid, methacrylic acid, maleic acid, fumaric acid, itaconic acid, and crotonic acid, or anhydrides thereof. Those resins may be used alone, two or more kinds of them may be used as a blend resin, or used as a blend resin with another resin. As the tackifier, for example, a rosin-based resin, a terpene-based resin, a petroleum resin, and the like are exemplified. Those resins may be used alone, or two or more kinds of them may be used in mixture.

In addition, a conventionally known additive may be added to the transparent adhesive resin layer. For example, a thermoplastic elastomer, any other thermoplastic resin, a rubber resin, an inorganic filler, a pigment, a plasticizer, an antioxidant, an antistatic agent, a light stabilizer, or an anti-blocking agent can be used as the additive; in particular, a resin obtained by adding a tackifier to a polyolefin resin (especially a polyethylene-based resin) is preferable. In addition, when a thermoplastic elastomer is used as the additive, a styrene-based elastomer is preferably used in order that the concavoconvex level of each interface between layers may be reduced.

Further, the transparent adhesive resin layer may be colorless, or may be colored as long as the layer is transparent. In addition, a luster pigment may be incorporated into the layer. When the adhesive resin layer is colored, for example, a luster pigment is preferably incorporated into the colored polyolefin-based resin layer because light reflected by the luster pigment transmits through the transparent, colored adhesive resin layer to provide a deep, unique metallic look. Alternatively, the color tone of each of the transparent adhesive resin layer and the polyolefin-based resin layer is preferably changed in some cases so that a special hue effect is obtained. A coloring agent to be used in the transparent adhesive resin layer is not particularly limited as long as the transparency of the layer is not impaired. For example, an organic pigment such as an azo-based pigment, a phthalocyanine-based pigment, a condensed polycyclic pigment, or a dye lake-based pigment can be used as the coloring agent.

(B) Adjustment of Shearing Stress of each Layer and Melt Flow Rate of Resin of which Transparent Adhesive Resin Layer is Constituted When no lubricant is blended into the transparent adhesive resin layer, or the loading of the lubricant is smaller than 0.01 wt %, the concavoconvex level of the interface between (1) the transparent polyester-based resin outer layer and (2) the transparent adhesive resin layer adjacent to the inner side of the outer layer, and the concavoconvex level of the interface between (2) the transparent adhesive resin layer and (3) the colored polyolefin-based resin layer adjacent to the inner side of the adhesive resin layer can be reduced by performing such an adjustment that the resins of which the respective layers are constituted satisfy the following conditions (a) and (b) simultaneously at the time of the molding of the multilayer plastic container.

(a) The shearing stresses (unit: KPa) of the resins of which the respective layers are constituted satisfy the relationship "(3) colored polyolefin-based resin—$55 \leq$ (2) transparent adhesive resin $\leq$ (1) transparent polyester-based resin—100."

Here, the shearing stress of each resin is a value measured for a pellet before melting of the resin to be used extruded from a resin-extruding portion having an orifice with a length of 10 mm and a diameter of 1 mm in conformity with JIS K7199 at a temperature of 210° C. and a shear rate of 50/s.

When the shearing stress of the resin of the transparent adhesive resin layer is lower than "(3) colored polyolefin-based resin—55", a ripple pattern as concavoconvex irregularities in the interface between the transparent adhesive resin layer and the colored polyolefin-based resin layer occurs. On the other hand, when the shearing stress of the resin of the transparent adhesive resin layer exceeds "(1) transparent polyester-based resin—100", a grain pattern as concavoconvex irregularities in the interface between the transparent polyester-based resin layer and the transparent adhesive resin layer occurs.

(b) The melt flow rate (MFR) (g/10 min) of the resin of which the transparent adhesive resin layer is constituted satisfies the relationship "$1.0 \leq MFR \leq 2.5$." Here, the melt flow rate of the resin is a value measured for a pellet before melting of the resin to be used in conformity with JIS K7210 at a temperature of 190° C. and a load of 2.16 Kg.

When the MFR of the resin of the transparent adhesive resin layer is less than 1.0, a grain pattern as concavoconvex irregularities in the interface between the transparent polyester-based resin layer and the transparent adhesive resin layer occurs. On the other hand, when the MFR of the resin of the transparent adhesive resin layer exceeds 2.5, a ripple pattern as concavoconvex irregularities in the interface between the transparent adhesive resin layer and the colored polyolefin-based resin layer occurs.

In the multilayer plastic container of the present invention, the total thickness of (1) the transparent polyester-based resin outer layer and (2) the transparent adhesive resin layer is preferably about 30 to 200 μm, or particularly preferably about 60 to 150 μm.

When the thickness is smaller than 30 μm, such problems as described below arises: the surface of the container is roughened by molding to show deteriorated gloss, and the polyester-based resin outer layer breaks at the time of the molding. On the other hand, when the thickness exceeds 200 μm, each transparent layer becomes so thick as to be opaque and to show a reduced transparency; further, a problem such as peeling between the layers of the multilayer plastic container may arise upon falling of a bottle made of the container.

In addition, when the total thickness of the transparent polyester-based resin outer layer and the transparent adhesive resin layer is increased, reflected light from the colored polyolefin-based resin layer which is closer to the center of the container than those layers are is slightly refracted, whereby the hue and gloss of the container become deep. In addition, when the container is provided with a metallic color tone by blending a luster pigment into the colored polyolefin-based resin layer, the total thickness of (1) the polyester-based resin outer layer and (2) the transparent adhesive resin layer is preferably made larger than the longer diameter of the pigment in order that a desired surface roughness may be obtained.

No particular limitations are imposed on the resin of which the colored polyolefin-based resin layer is constituted, the resin layer being closer to the center of the container than the transparent adhesive resin layer is. For example, any one of the conventionally known polyolefin-based resins including a low-density polyethylene, a linear, low-density polyethylene, a medium-density polyethylene, a high-density polyethylene, polypropylene, a propylene-ethylene copolymer, an ethylene-vinyl acetate copolymer, and a polyolefin resin subjected to graft denaturation with an ethylene-based, unsaturated carboxylic acid or an anhydride of the acid can be used. A particularly preferable polyolefin-based resin is, for example, a propylene-ethylene block copolymer. One kind of those polyolefin-based resins may be used alone, or two or more kinds of them may be used as a mixture. In addition, repros (recovered materials) produced at the time of, for example, the molding of the container may be mixed into the polyolefin-based resin.

The colored polyolefin-based resin layer may be a transparent, colored layer, or may be an opaque, colored layer. In addition, the number of colored layers of which the colored polyolefin-based resin layer is constituted is not limited to one, and may be two or more. In addition, an intermediate layer composed of, for example, any other resin, or an inner surface resin layer composed of, for example, a polyolefin-based resin of which the inner surface of the container is constituted can be further provided as an inner layer to the colored polyolefin-based resin layer.

A coloring agent to be blended into the colored polyolefin-based resin layer is not particularly limited, and, for example, an organic pigment such as an azo-based pigment, a phthalocyanine-based pigment, a condensed polycyclic pigment, or a dye lake-based pigment, or a luster pigment such as an aluminum-based luster pigment such as a polarizing pearl pigment, a mica-based luster pigment, or a glass-based luster pigment can be used. One kind of those coloring agents may be used alone, or two or more kinds of them may be used in combination. In addition, any one of those coloring agents and, for example, an extender pigment may be used in combination.

When a luster pigment is blended into the colored polyolefin-based resin layer, light reflected by the luster pigment passes through combined layers of (1) the transparent polyester-based resin outer layer and (2) the transparent adhesive resin layer, whereby a multilayer plastic container with a metallic color tone having a deep, glossy look can be obtained.

Particularly preferable is the case where the colored polyolefin-based resin layer is of a multilayer constitution composed of a transparent, colored resin layer adjacent to (2) the transparent adhesive resin layer and a colored resin layer containing the luster pigment provided as an inner layer to the transparent, colored resin layer. This is because such a deep, unique metallic look that printing is performed with transparent ink on a metal ground can be obtained.

EXAMPLES

Next, the high-gloss, multilayer plastic container of the present invention is described in more detail by way of examples. However, the following specific examples do not limit the present invention.

FIG. 1 is a schematic sectional view illustrating an example of the layer constitution of the multilayer plastic container of the present invention. The container has (1) a transparent polyester-based resin outer layer A, (2) a transparent adhesive resin layer B, (3) a colored polyolefin-based resin layer C containing a luster pigment, and (4) a colored polyolefin-based resin layer D free of any luster pigment in the stated order from its outer surface side.

In each of the following examples, a container having the layer constitution illustrated in FIG. 1 was produced as described below. Four extruders (hereinafter, extruders for resins of which the respective resin layers A, B, C, and D are constituted are referred to as extruders A, B, C, and D, respectively) were loaded with the resins. While being heated, the respective resins were plasticized and kneaded, and the kneaded product was extruded. After that, a multilayer parison composed of (1) the transparent polyester-based resin outer layer A, (2) the transparent adhesive resin layer B, (3) the colored polyolefin-based resin layer C containing a luster pigment, and (4) the colored polyolefin-based resin layer D free of any luster pigment in the stated order from its outer surface side was formed by using a multilayer head. Next, the parison was pinched with a die having a cavity, and compressed air was blown into the parison, whereby a square-type, hollow container having a volume of 500 mL was produced. The die used here had an inner surface roughness Ra of 0.6 μm.

In each of the following examples, the respective physical property values were measured by the methods described above. In addition, the water content of a polyester-based resin was measured for a pellet before melting by a Karl-Fischer method. The intrinsic viscosity of the polyester-based resin was measured for the pellet before melting in conformity with JIS K7390. Upon measurement of the respective physical property values, a "Surfcom 1400A-3DF-12 manufactured by TOKYO SEIKI Co., Ltd." was used as a stylus roughness measuring device, a "RM2125RT for inspection manufactured by Leica" was used as a rotary microtome, a "measuring microscope STM 5-321 manufactured by Olympus Corporation" was used as an optical microscope, and a "CAPILOGRAPH 1D manufactured by Toyo Seiki Seisakusho, LTD." was used as a device for measuring the shearing stress of a resin.

In addition, the surface roughness Ra of the multilayer plastic container was measured as described below: a portion having a large surface roughness was directly cut out, or cut out in a size measuring 15 mm by 15 mm, of a flat portion except a nozzle portion of the container, and was then subjected to the measurement. In addition, the average of the values measured as described below was adopted as the "total thickness of the outer layer and the transparent adhesive resin layer": the thicknesses of eight points placed at an interval of 45° in the circumferential direction of each of the upper portion, middle portion, and lower portion of the body of the container were measured. Further, the container was evaluated for its gloss by visually observing the entire surface of the flat portion of the container except the nozzle portion as an object.

Example 1

The extruder A having an aperture of 40 mm was loaded with a transparent, amorphous, cyclohexanedimethanol (CHDM)-based copolymer polyethylene terephthalate resin having an intrinsic viscosity of 0.7 (dl/g), a shearing stress of 190 (KPa), and a water content of 600 ppm. The extruder B having an aperture of 40 mm was loaded with a transparent, colorless, low-density polyethylene (LDPE)-based resin of a tackifier-added type containing an olefin-based elastomer and having an MFR of 1.5 (g/10 min) and a shearing stress of 90 (KPa). The extruder C having an aperture of 50 mm was loaded with a transparent, colorless propylene/ethylene block copolymer resin having an MFR of 0.8 and a shearing stress of 120 (KPa), 0.5 wt % of a pearl red (mica-based pigment having an average particle diameter of 21 μm) as a luster pigment, and 0.5 wt % of an azo-based red pigment as a coloring pigment. The extruder D having an aperture of 40 mm was loaded with the ethylene/propylene block copolymer resin and 0.3 wt % of an azo-based red pigment as a coloring pigment. The resins loaded into the respective extruders were plasticized and kneaded while being heated, and the kneaded products were extruded from the multilayer head, whereby a multilayer parison was formed. Next, the parison was pinched with a die having a cavity, and compressed air was blown into the parison, whereby a square-type, hollow bottle having a volume of 500 mL was obtained.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 0.05 μm, the concavoconvex level of an interface between the transparent polyester-based resin outer layer A and the transparent adhesive resin layer B was 15 μm, the concavoconvex level of an interface between the transparent adhesive resin layer B and the colored polyolefin-based resin layer C was 6 μm, and the bottle had good surface gloss.

Example 2

A similar hollow bottle was obtained in the same manner as in Example 1 except that a transparent, colorless, LDPE-based resin of a tackifier-added type containing a styrene-based elastomer and having an MFR of 1.5 (g/10 min) and a shearing stress of 70 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 0.10 μm, the concavoconvex level of an interface between the transparent polyester-based resin outer layer A and the transparent adhesive resin layer B was 10 μm, the concavoconvex level of an interface between the transparent adhesive resin layer B and the colored polyolefin-based resin layer C was 15 μm, and the bottle had good surface gloss.

Example 3

A similar hollow bottle was obtained in the same manner as in Example 1 except that a transparent, colorless, LDPE-based resin of a tackifier-added type containing an olefin-based elastomer and having an MFR of 2.5 (g/10 min) and a shearing stress of 65 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 0.17 μm, the concavoconvex level of an interface between the transparent polyester-based resin outer layer A and the transparent adhesive resin layer B was 10 μm, the concavoconvex level of an interface between the transparent adhesive resin layer B and the colored polyolefin-based resin layer C was 8 μm, and the bottle had good surface gloss.

Comparative Example 1

A similar hollow bottle was obtained in the same manner as in Example 1 except that a transparent, colorless, LDPE-based resin of a tackifier-added type containing an olefin-based elastomer and having an MFR of 0.8 (g/10 min) and a shearing stress of 140 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 1.5 μm, the concavoconvex level of an interface between the transparent polyester-based resin outer layer A and the transparent adhesive resin layer B was 30 μm, the concavoconvex level of an interface between the transparent adhesive resin layer B and the colored polyolefin-based resin layer C was 8 μm, and a grain pattern occurred in the interface between the outer layer and the transparent adhesive resin layer.

Comparative Example 2

A similar hollow bottle was obtained in the same manner as in Example 1 except that a transparent, colorless, LDPE-based resin of a tackifier-added type containing an olefin-based elastomer and having an MFR of 0.3 (g/10 min) and a shearing stress of 105 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 1.3 μm, the concavoconvex level of an interface between the transparent polyester-based resin outer layer A and the transparent adhesive resin layer B was 20 μm, the concavoconvex level of an interface between the transparent adhesive resin layer B and the colored polyolefin-based resin layer C was 8 μm, and a grain pattern occurred in the interface between the outer layer A and the transparent adhesive resin layer.

Comparative Example 3

A similar hollow bottle was obtained in the same manner as in Example 1 except that a transparent, colorless, LDPE-based resin of a tackifier-added type containing an olefin-based elastomer and having an MFR of 3.5 (g/10 min) and a shearing stress of 60 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 0.5 μm, the concavoconvex level of an interface between the transparent polyester-based resin outer layer A and the transparent adhesive resin layer B was 8 μm, the concavoconvex level of an interface between the transparent adhesive resin layer B and the colored polyolefin-based resin layer C was 30 μm, and a ripple pattern occurred in the interface between the transparent adhesive resin layer and the colored polyolefin-based resin layer containing a luster pigment.

Comparative Example 4

A similar hollow bottle was obtained in the same manner as in Example 1 except that a transparent, colorless, LDPE-based resin of a tackifier-added type containing an olefin-based elastomer and having an MFR of 6.0 (g/10 min) and a shearing stress of 48 (KPa) was used in the transparent adhesive resin layer B in Example 1.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 1.0 μm, the concavoconvex level of an interface between the transparent polyester-based resin outer layer A and the transparent adhesive resin layer B was 10 μm, the concavoconvex level of an interface between the transparent adhesive resin layer B and the colored polyolefin-based resin layer C was 40 μm, and a ripple pattern occurred in the interface between the transparent adhesive resin layer and the colored polyolefin-based resin layer containing a luster pigment.

Example 4

A similar hollow bottle was obtained in the same manner as in Example 2 except that 0.05 wt % of a fluorine particle lubricant having an average particle diameter of 7 μm was incorporated into the transparent adhesive resin layer in Example 2.

The thickness of each layer of the bottle was as follows: the thickness of the outer layer A was 50 μm, the thickness of the transparent adhesive resin layer B was 70 μm, the thickness of the colored polyolefin-based resin layer C containing a luster pigment was 710 μm, and the thickness of the colored polyolefin-based resin layer D was 170 μm. In addition, the bottle had a surface roughness Ra of 0.04 μm, the concavoconvex level of an interface between the transparent polyester-based resin outer layer A and the transparent adhesive resin layer B was 6 µm, the concavoconvex level of an interface between the transparent adhesive resin layer B and the colored polyolefin-based resin layer C was 5 µm, and the bottle had good surface gloss.

Example 5

A similar hollow bottle was obtained in the same manner as in Comparative Example 2 except that 0.05 wt % of a fluorine particle lubricant having an average particle diameter of 7 µm was incorporated into the transparent adhesive resin layer in Comparative Example 2.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, the bottle had a surface roughness Ra of 0.11 µm, the concavoconvex level of an interface between the transparent polyester-based resin outer layer A and the transparent adhesive resin layer B was 15 µm, the concavoconvex level of an interface between the transparent adhesive resin layer B and the colored polyolefin-based resin layer C was 8 µm, and the bottle had good surface gloss.

Example 6

A similar hollow bottle was obtained in the same manner as in Comparative Example 3 except that 0.05 wt % of a fluorine particle lubricant having an average particle diameter of 7 µm incorporated into the transparent adhesive resin layer in Comparative Example 3.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, the bottle had a surface roughness Ra of 0.12 µm, the concavoconvex level of an interface between the transparent polyester-based resin outer layer A and the transparent adhesive resin layer B was 8 µm, the concavoconvex level of an interface between the transparent adhesive resin layer B and the colored polyolefin-based resin layer C was 9 µm, and the bottle had good surface gloss.

Example 7

A similar hollow bottle was obtained in the same manner as in Example 6 except that 0.02 wt % of a fluorine particle lubricant having an average particle diameter of 7 µm was incorporated into the transparent adhesive resin layer in Example 6.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, the bottle had a surface roughness Ra of 0.18 µm, the concavoconvex level of an interface between the transparent polyester-based resin outer layer A and the transparent adhesive resin layer B was 8 µm, the concavoconvex level of an interface between the transparent adhesive resin layer B and the colored polyolefin-based resin layer C was 14 µm, and the bottle had good surface gloss.

Example 8

A similar hollow bottle was obtained in the same manner as in Example 6 except that 0.10 wt % of a fluorine particle lubricant having an average particle diameter of 7 µm was incorporated into the transparent adhesive resin layer in Example 6.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, the bottle had a surface roughness Ra of 0.06 µm, the concavoconvex level of an interface between the transparent polyester-based resin outer layer A and the transparent adhesive resin layer B was 8 µm, the concavoconvex level of an interface between the transparent adhesive resin layer B and the colored polyolefin-based resin layer C was 7 µm, and the bottle had good surface gloss.

Comparative Example 5

A similar hollow bottle was obtained in the same manner as in Example 6 except that 0.005 wt % of a fluorine particle lubricant having an average particle diameter of 7 µm was incorporated into the transparent adhesive resin layer in Example 6.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, the bottle had a surface roughness Ra of 0.4 µm, the concavoconvex level of an interface between the transparent polyester-based resin outer layer A and the transparent adhesive resin layer B was 8 µm, the concavoconvex level of an interface between the transparent adhesive resin layer B and the colored polyolefin-based resin layer C was 22 µm, and a ripple pattern occurred in the interface between the transparent adhesive resin layer B and the colored polyolefin-based resin layer C containing a luster pigment.

Comparative Example 6

A similar hollow bottle was obtained in the same manner as in Example 6 except that 0.6 wt % of a fluorine particle lubricant having an average particle diameter of 7 µm was incorporated into the transparent adhesive resin layer in Example 6.

The thickness of each layer of the bottle was as follows: the thickness of the outer layer A was 50 µm, the thickness of the transparent adhesive resin layer B was 70 µm, the thickness of the colored polyolefin-based resin layer C containing a luster pigment was 710 µm, and the thickness of the colored polyolefin-based resin layer D was 170 µm. In addition, neither the surface roughness Ra of the bottle nor the concavoconvex level of an interface between the transparent polyester-based resin outer layer A and the transparent adhesive resin layer B could be measured because the outer layer A peeled. The concavoconvex level of an interface between the transparent adhesive resin layer B and the colored polyolefin-based resin layer C was 7 μm.

Example 9

A similar hollow bottle was obtained in the same manner as in Example 2 except that the discharge amount of each of the extruders A and B in Example 2 was changed.

The thickness of each layer of the bottle was as follows: the thickness of the outer layer A was 13 μm, the thickness of the transparent adhesive resin layer B was 17 μm, the thickness of the colored polyolefin-based resin layer C containing a luster pigment was 710 μm, and the thickness of the colored polyolefin-based resin layer D was 170 μm. In addition, the bottle had a surface roughness Ra of 0.06 μm, the concavoconvex level of an interface between the transparent polyester-based resin outer layer A and the transparent adhesive resin layer B was 13 μm, the concavoconvex level of an interface between the transparent adhesive resin layer B and the colored polyolefin-based resin layer C was 8 μm, and the bottle had good surface gloss.

Example 10

A similar hollow bottle was obtained in the same manner as in Example 2 except that the discharge amount of each of the extruders A and B in Example 2 was changed.

The thickness of each layer of the bottle was as follows: the thickness of the outer layer A was 83 μm, the thickness of the transparent adhesive resin layer B was 117 μm, the thickness of the colored polyolefin-based resin layer C containing a luster pigment was 710 μm, and the thickness of the colored polyolefin-based resin layer D was 170 μm. In addition, the bottle had a surface roughness Ra of 0.05 μm, the concavoconvex level of an interface between the transparent polyester-based resin outer layer A and the transparent adhesive resin layer B was 6 μm, the concavoconvex level of an interface between the transparent adhesive resin layer B and the colored polyolefin-based resin layer C was 7 μm, and the bottle had good surface gloss.

Example 11

A similar hollow bottle was obtained in the same manner as in Example 2 except that the resin of each of the colored polyolefin-based resin layer C and the colored polyolefin-based resin layer D in Example 2 was changed to a high-density polyethylene resin having an MFR of 0.36 (g/10 min) and a shearing stress of 120 (KPa).

The thickness of each layer of the bottle was as follows: the thickness of the outer layer A was 50 μm, the thickness of the transparent adhesive resin layer B was 120 μm, the thickness of the colored polyolefin-based resin layer C containing a luster pigment was 710 μm, and the thickness of the colored polyolefin-based resin layer D was 170 μm. In addition, the bottle had a surface roughness Ra of 0.10 μm, the concavoconvex level of an interface between the transparent polyester-based resin outer layer A and the transparent adhesive resin layer B was 10 μm, the concavoconvex level of an interface between the transparent adhesive resin layer B and the colored polyolefin-based resin layer C was 15 μm, and the bottle had good surface gloss.

The invention claimed is:

1. A high-gloss, multilayer plastic container, comprising:
   (1) a transparent polyester-based resin outer layer;
   (2) a transparent adhesive resin layer; and
   (3) a colored polyolefin-based resin layer in the stated order from an outer surface side of the container, wherein:
   the transparent polyester-based resin outer layer has a surface roughness Ra of 0.2 μm or less; and
   an interface between (2) the transparent adhesive resin layer and (3) the colored polyolefin-based resin layer has a concavoconvex level of 15 μm or less.

2. A high-gloss, multilayer plastic container according to claim 1, wherein an interface between (1) the transparent polyester-based resin outer layer and (2) the transparent adhesive resin layer has a concavoconvex level of 15 μm or less.

3. A high-gloss, multilayer plastic container according to claim 1, wherein (3) the colored polyolefin-based resin layer contains a luster pigment.

4. A high-gloss, multilayer plastic container according to claim 1, wherein (3) the colored polyolefin-based resin layer is constituted of a block polypropylene-based resin.

5. A high-gloss, multilayer plastic container according to claim 1, wherein (3) the colored polyolefin-based resin layer is constituted of a high-density polyethylene-based resin.

6. A high-gloss, multilayer plastic container according to claim 1, wherein (2) the transparent adhesive resin layer is constituted of a polyethylene-based resin.

7. A high-gloss, multilayer plastic container according to claim 1, wherein a layer constitution of the multilayer plastic container has (1) the transparent polyester-based resin outer layer, (2) the transparent adhesive resin layer, (3) the colored polyolefin-based resin layer containing a luster pigment, and (4) a colored polyolefin-based resin layer free of any luster pigment in the stated order from the outer surface side.

8. A high-gloss, multilayer plastic container according to claim 1, further comprising a polyolefin-based resin inner layer.

9. A high-gloss, multilayer plastic container according to claim 1, wherein a total thickness of (1) the transparent polyester-based resin outer layer and (2) the transparent adhesive resin layer is 30 to 200 μm.

* * * * *